(12) United States Patent
Uwatoko et al.

(10) Patent No.: US 8,405,870 B2
(45) Date of Patent: Mar. 26, 2013

(54) METHOD AND APPARATUS FOR DETECTING DEFECTS IN AN IMAGE FORMING APPARATUS

(75) Inventors: Koki Uwatoko, Kanagawa (JP); Koji Adachi, Kanagawa (JP); Kaoru Yasukawa, Kanagawa (JP); Norikazu Yamada, Kanagawa (JP); Shigehiro Furukawa, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 832 days.

(21) Appl. No.: 12/544,718

(22) Filed: Aug. 20, 2009

(65) Prior Publication Data

US 2010/0123914 A1 May 20, 2010

(30) Foreign Application Priority Data

Nov. 19, 2008 (JP) ................................ 2008-295494

(51) Int. Cl.
*G06F 15/00* (2006.01)
(52) U.S. Cl. ................ 358/1.9; 399/27; 399/49; 399/54
(58) Field of Classification Search ......................... None
See application file for complete search history.

(56) References Cited

U.S. PATENT DOCUMENTS

| 6,873,436 B1 * | 3/2005 | Terada et al. | 358/1.9 |
| 7,079,151 B1 * | 7/2006 | Rublee | 345/589 |
| 2008/0199193 A1 * | 8/2008 | Nakazato et al. | 399/49 |

FOREIGN PATENT DOCUMENTS

| JP | A-2001-136314 | 5/2001 |
| JP | A-2002-27252 | 1/2002 |
| JP | A-2004-153586 | 5/2004 |
| JP | A-2005-309078 | 11/2005 |
| JP | A-2007-74290 | 3/2007 |

OTHER PUBLICATIONS

Notification of Reasons for Refusal dated Sep. 14, 2010 in corresponding Japanese Patent Application No. 2008-295494 (with translation).

* cited by examiner

*Primary Examiner* — King Poon
*Assistant Examiner* — David S Cammack
(74) *Attorney, Agent, or Firm* — Oliff & Berridge, PLC

(57) ABSTRACT

An image processing apparatus includes a determination unit determining, based on a pixel value of a prescribed background color area in image data obtained by inputting a printed image, and based on information regarding a color of a toner used in printing the image, whether or not the background color of the image corresponds to the color of the toner.

17 Claims, 7 Drawing Sheets

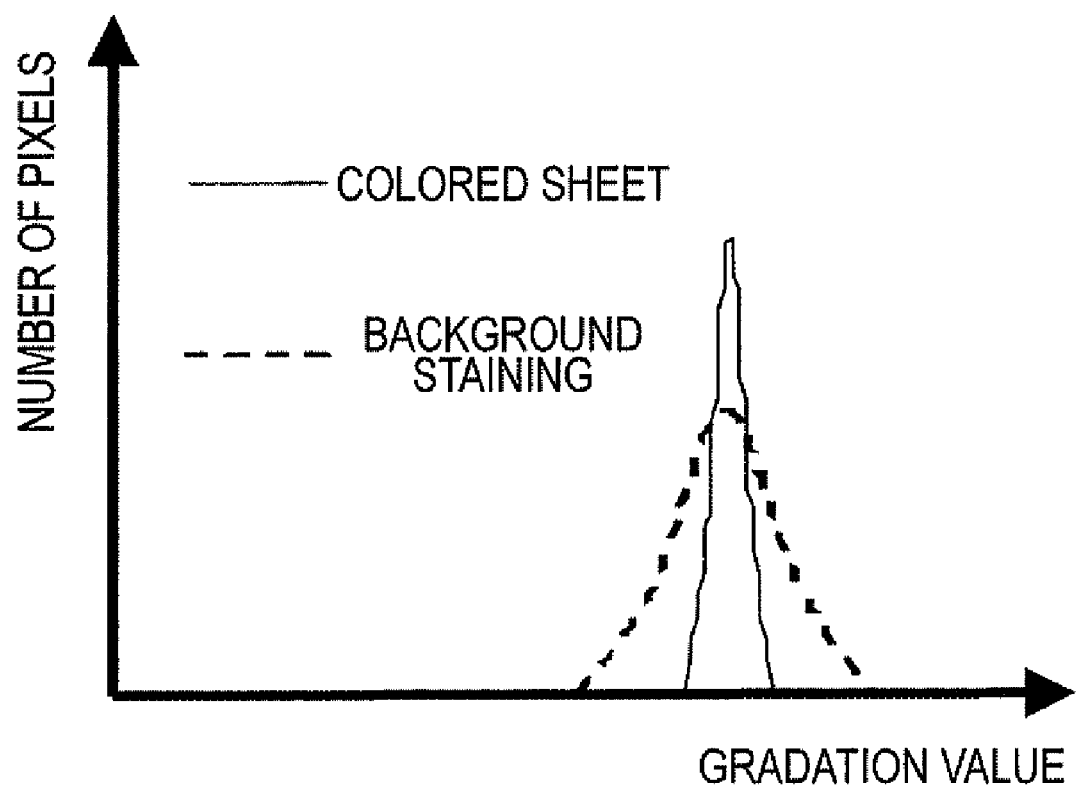

METHOD AND APPARATUS FOR DETECTING DEFECTS IN AN IMAGE FORMING APPARATUS

CROSS-REFERENCE TO RELATED APPLICATIONS

This application is based on and claims priority under 35 USC 119 from Japanese Patent Application No. 2008-295494 filed on Nov. 19, 2008.

BACKGROUND

1. Technical Field

The present invention relates to an image processing apparatus and a computer readable medium.

2. Related Art

A technique is developed which detects a failure in an image forming apparatus, such as a copy machine, a printer, a scanner, or the like, and estimates the cause of failure.

As an example of defect detection in image data obtained by inputting a sheet with a test pattern printed thereon, it is determined whether or not the background color of the sheet with the test pattern thereon printed is white, and when the background color is not white, the occurrence of defects is detected. In this example, if a test pattern is printed on a colored sheet having a background color other than white or a sheet which originally had a white background color but underwent yellowing due to deterioration or the like, and image data obtained by inputting the test pattern through a scanner is analyzed, since the background color is not white even though no defect actually occurred in image data, it may be determined that a defect has occurred in the image. Such erroneous determination can be prevented by a defect detection processing using image data which is obtained by removing or correcting the background color when the detection of the background color of image data shows the background color to be a chromatic color.

One type of defect in the image printed on the sheet is that toner is stuck so as there is a thin covering over a partial area of the sheet or the entire surface of the sheet. Such a defect in the image is hereinafter called "background staining". According to the technique in which, when the background color of a chromatic color is detected in image data, after the background color is removed or corrected, image data is analyzed and failure diagnosis of the image forming apparatus is performed. In this way, the background color of a chromatic color due to toner sticking may be removed or corrected, and the occurrence of background staining will not be detected.

SUMMARY

According to an aspect of the invention, there is provided an image processing apparatus including a determination unit determining, based on a pixel value of a prescribed background color area in image data obtained by inputting a printed image, and based on information regarding a color of a toner used in printing the image, whether or not the background color of the image corresponds to the color of the toner.

BRIEF DESCRIPTION OF THE DRAWINGS

Exemplary embodiments of the invention will be described in detail based on the following figures, wherein:

FIG. 7 is a diagram showing an example of the histogram of gradation values of pixels.

DETAILED DESCRIPTION

Figure 1:
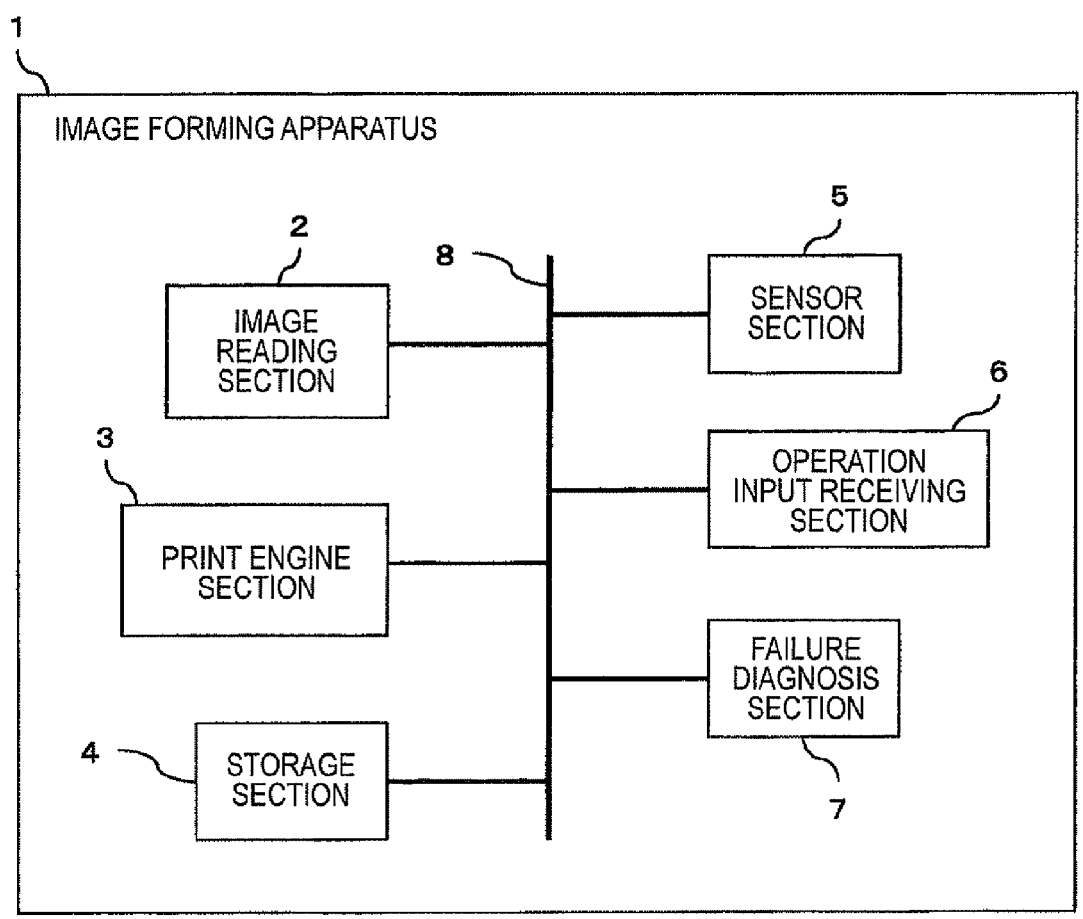
FIG. 1 is a block diagram showing a schematic example of the configuration of an image forming apparatus.

FIG. 1 is a block diagram showing a schematic example of the configuration of an image forming apparatus 1. The image forming apparatus 1 is configured such that an image inputting section 2, a print engine section 3, a storage section 4, a sensor section 5, an operation input receiving section 6, and a failure diagnosis section 7 are connected to each other through a bus 8.

The image inputting section 2 inputs a document image through a scanner, and generates image data which is electronic data corresponding to the document image. Image data generated by the image inputting section 2 may include a plurality of pixels, and each pixel may have the gradation values of three color components of R (Red), G (Green), and B (Blue). The gradation value of each color component represents one of a plurality of levels. Hereinafter, description will be made regarding various examples of the invention assuming that the gradation value of each color component is an integer ranging from 0 to 255 which represents one of 256 gradation levels. Note that image data generated by inputting the document image through the image inputting section 2 is stored in the storage section 4, or is stored in a storage device provided in a server or the like which is connected to the image forming apparatus 1 through a communication unit (not shown). With the image inputting section 2, the image forming apparatus 1 functions as a scanner.

The print engine section 3 outputs image data on a medium, such as a sheet or the like. The print engine section 3 uses toner of a plurality of colors to produce the colors of image data on the medium by the combination of densities of the respective toner colors, thereby realizing color print. In the following examples of the invention, it is assumed that the print engine section 3 performs color print by using toner of four colors of Y (Yellow), M (Magenta), C (Cyan), and K (Black). Image data which is output from the print engine section 3 may be, for example, image data which is generated by inputting the document image through the image inputting section 2. In this case, the image forming apparatus 1 can be deemed to function as a copy machine. Further, the print engine section 3 receives a print instruction from a computer connected to the image forming apparatus 1 through a communication unit (not shown), and prints out image data received along with the print instruction. In this case, the image forming apparatus 1 can be deemed to function as a printer.

The storage section 4 is a storage device that stores information necessary for processing in the image forming apparatus 1. The storage section 4 stores, for example, image data which is obtained by inputting the document image through the image inputting section 2. The storage section 4 also stores history information regarding the operation state of the image forming apparatus 1, such as the number of fed sheets, the number of copies, or the like in the image forming apparatus 1. The storage section 4 further stores information necessary for execution of a failure diagnosis processing, such as a test pattern used in a processing by the failure diagnosis section 7 described below, or the like.

The sensor section 5 acquires internal state information of the image forming apparatus 1. The term "internal state information" is a concept including the driving current or vibration of parts, such as a motor for driving a sheet transport mechanism (not shown) provided in the image forming apparatus 1 and the like, sheet transit time, internal temperature or humidity of the image forming apparatus 1, the toner residual quantity, and the like. The sensor section 5 includes sensors according to various kinds of internal state information, and acquires various kinds of internal state information from the sensors.

The operation input receiving section 6 receives the input of information by an operator of the image forming apparatus 1, such as a user, an administrator, or the like. For example, the operation input receiving section 6 receives input of an input instruction by scanning or a copy instruction from the operator, or receives input of information necessary for execution of processing by the failure diagnosis section 7 described below. The operation input receiving section 6 is realized by, for example, an operation panel including a display device, such as a liquid crystal display panel or the like, and an input device, such as a touch panel, a numeric keypad, or the like.

The failure diagnosis section 7 performs failure diagnosis on the image forming apparatus 1 by using internal state information of the image forming apparatus 1 acquired through the sensor section 5, input information from the operator received by the operation input receiving section 6, and information stored in the storage section 4, such as history information of the image forming apparatus 1, and the like. The failure diagnosis section 7 is realized by, for example, a processor, such as a Central Processing Unit (CPU), a Micro Processing Unit (MPU), or the like. For example, a program which describes the procedure of the processing of each section of the failure diagnosis section 7 is stored in the storage section 4, and the processor, such as a CPU, an MPU, or the like, inputs and executes the program, so the relevant processor functions as the failure diagnosis section 7.

Figure 2:
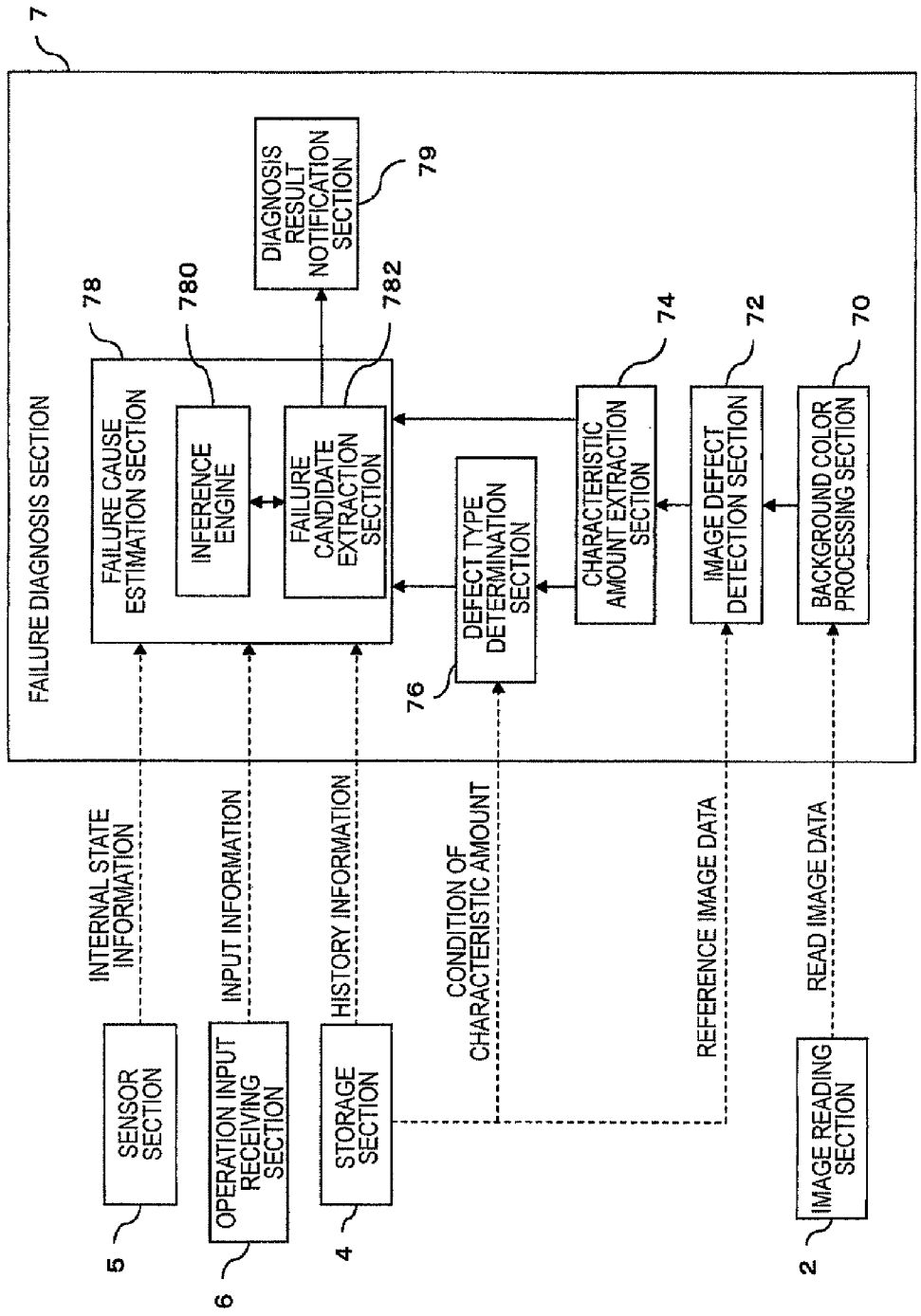
FIG. 2 is a block diagram showing an example of the functional configuration of a failure diagnosis section.

FIG. 2 is a block diagram showing an example of the functional configuration of the failure diagnosis section 7. The failure diagnosis section 7 includes a background color processing section 70, an image defect detection section 72, a characteristic amount extraction section 74, a defect type determination section 76, a failure cause estimation section 78, and a diagnosis result notification section 79.

By using image data which is generated by inputting a sheet with a prescribed test pattern printed out by the print engine section 3 (hereinafter, referred to as "test pattern sheet") through the image inputting section 2, the background color processing section 70 performs processing on the background color of the test pattern sheet. The background color processing section 70 detects the background color of the sheet, determines presence/absence of the occurrence of a background staining defect based on the detected background color, and, if necessary, corrects the background color. Some of the functions of the background color processing section 70 function as an image processing apparatus according to the exemplary embodiments of the present invention.

The image defect detection section 72 compares image data processed by the background color processing section 70 with reference image data stored beforehand in the storage section 4, and detects defects in the output image. Reference image data is image data corresponding to a test pattern output from the print engine section 3.

The characteristic amount extraction section 74 extracts various characteristic amounts regarding image defects from the detection result of the image defect detection section 72. The characteristic amounts are, for example, the amounts representing the state of the image defect, such as the shape, size, density, contour state, direction, position, cyclic property, generation area, and the like of the image defect.

The defect type determination section 76 determines the type of the image defect based on the characteristic amounts extracted by the characteristic amount extraction section 74. The types of defects include, for example, spots, black streaks, black bands, blank spots, white bands, and the like. The conditions of the characteristic amounts for determining a predetermined type of defect are stored in advance in the storage section 4, so the defect type determination section 76 performs determination with reference to the conditions.

When a defect has occurred in an image, the failure cause estimation section 78 estimates the cause of the failure in the image forming apparatus 1 by using information regarding the image defect acquired by the characteristic amount extraction section 74 and the defect type determination section 76, internal state information of the image forming apparatus 1 to be acquired from the sensor section 5, input information from the operator to be acquired through the operation input receiving section 6, and information stored in the storage section 4, such as history information of the image forming apparatus 1 and the like. The failure cause estimation section 78 includes an inference engine 780 and a failure candidate extraction section 782. The inference engine 780 calculates the probability (failure cause probability) that each cause candidate which may cause failure is the primary cause of the occurred failure based on the acquired internal state information and the like. The inference engine 780 is formed by, for example, a Bayesian network. With regard to the Bayesian network, the causal relationship represents a complex problem area, so the dependency relationship between a plurality of variables is sequentially linked and expressed as a network having a graph structure. The Bayesian network represents the dependency relationship between the variables by a directed graph. The failure candidate extraction section 782 extracts the candidates of the failure cause in accordance with the failure cause probability calculated by the inference engine 780.

The diagnosis result notification section 79 performs processing to notify the user or the administrator of the estimation result of the failure cause estimation section 78. For example, the diagnosis result notification section 79 displays the diagnosis result on a display device (not shown) provided in the image forming apparatus 1, or transmits information representing the diagnosis result to a computer connected to the image forming apparatus 1 through a communication unit (not shown).

Figure 3:
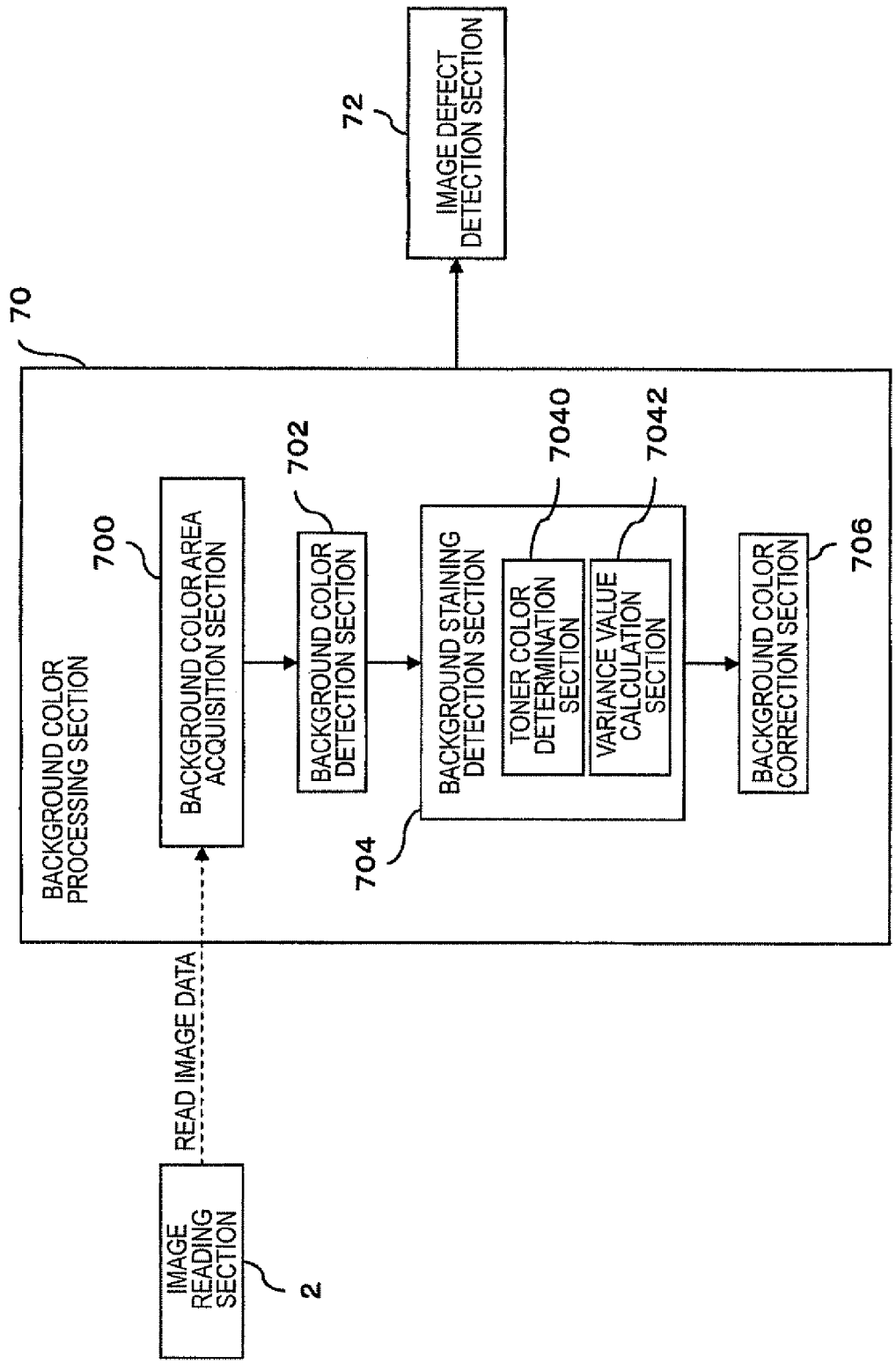
FIG. 3 is a block diagram showing an example of the functional configuration of a background color processing section.

FIG. 3 is a block diagram showing an example of the functional configuration of the background color processing section 70. The background color processing section 70 includes a background color area acquisition section 700, a background color detection section 702, a background staining detection section 704, and a background color correction section 706.

The background color area acquisition section 700 receives image data, which is generated by inputting the test pattern sheet by using an image inputting device, from the image inputting section 2, and acquires from received image data the pixel value of a prescribed area (background color area) as an area of a background color. In this example, the gradation value of each color component of RGB of each pixel included in the background color area is acquired.

Figure 4:
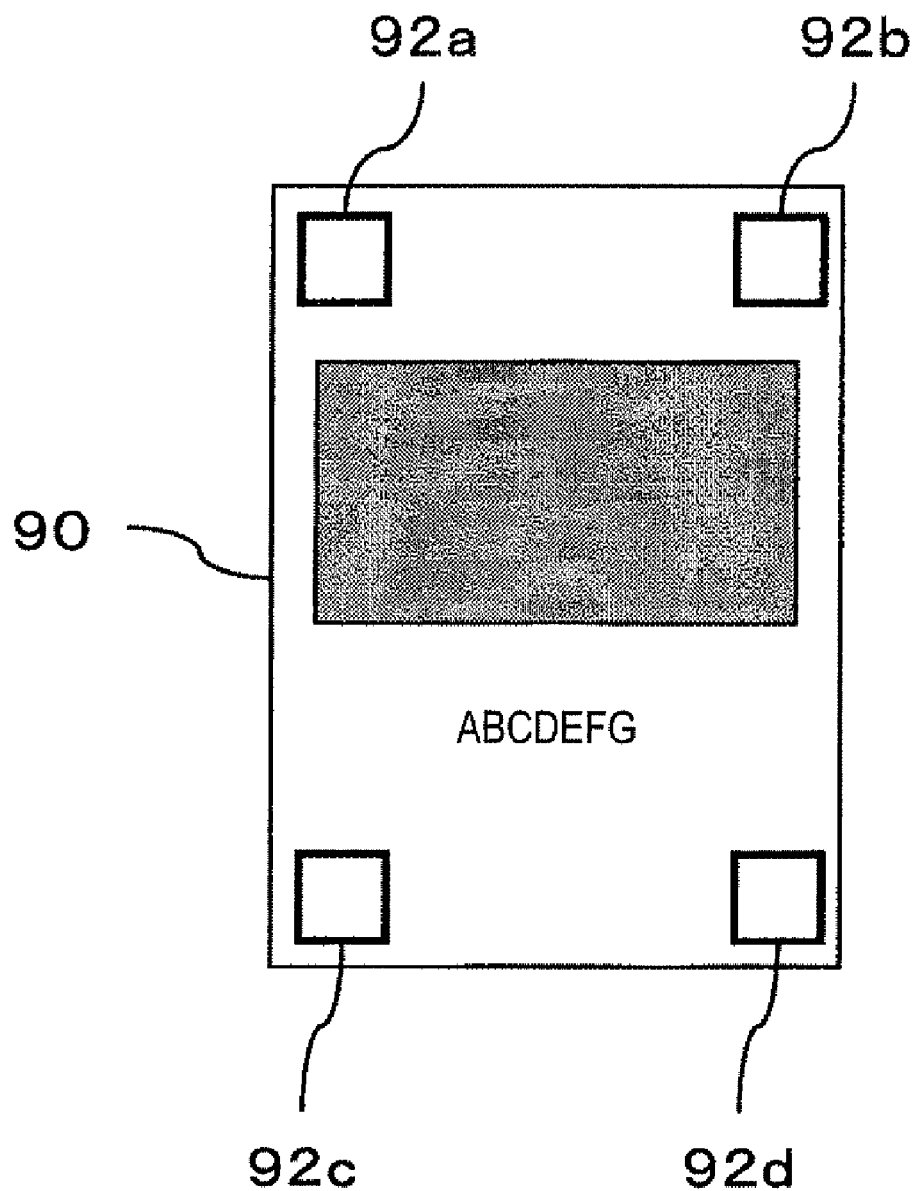
FIG. 4 is a diagram showing an example of a test pattern.

FIG. 4 shows an example of a test pattern. In the example of FIG. 4, a test pattern 90 includes background color areas 92a, 92b, 92c, and 92d around the upper right side, upper left side, lower right side, and lower left side. The test pattern 90 is prescribed and stored in the storage section 4. At the time of execution of the failure diagnosis processing of the image forming apparatus 1, as described below, the print engine section 3 acquires the test pattern 90 from the storage section 4 and prints the test pattern on the sheet in accordance with the instruction of the operator. The background color area acquisition section 700 acquires the values of pixels in the areas corresponding to the background color areas 92a, 92b, 92c, and 92d in the test pattern 90 from image data which is acquired by inputting the test pattern sheet printed by using the image inputting section 2.

Returning to FIG. 3, the background color detection section 702 detects the background color of the test pattern sheet by using the pixel values of the background color areas acquired by the background color area acquisition section 700.

The background staining detection section 704 detects the occurrence of background staining in the test pattern sheet by using the background color of the test pattern sheet detected by the background color detection section 702. The background staining detection section 704 includes a toner color determination section 7040 and a variance value calculation section 7042. The toner color determination section 7040 determines whether or not the background color of the test pattern sheet corresponds to any one color of the toner used in printing the test pattern sheet. In the exemplary embodiment, the toner color determination section 7040 determines whether or not the background color corresponds to any one color of toner of YMCK. The variance value calculation section 7042 calculates the variance of the pixel values of the background color areas. If the toner color determination section 7040 determines that the background color of the test pattern sheet corresponds to any one toner color, the background staining detection section 704 detects the occurrence of background staining. Alternatively, the background staining detection section 704 detects the occurrence of background staining by using the variance calculated by the variance value calculation section 7042, in addition to the determination result of the toner color determination section 7040.

In the case that the background color of the test pattern sheet is not white, when the background staining detection section 704 does not detect the occurrence of background staining, the background color correction section 706 corrects the background color with respect to image data of the test pattern sheet in accordance with the values of pixels in the background color areas.

Image data of the test pattern sheet processed by the background color processing section 70 is delivered to the image defect detection section 72.

Figure 5:
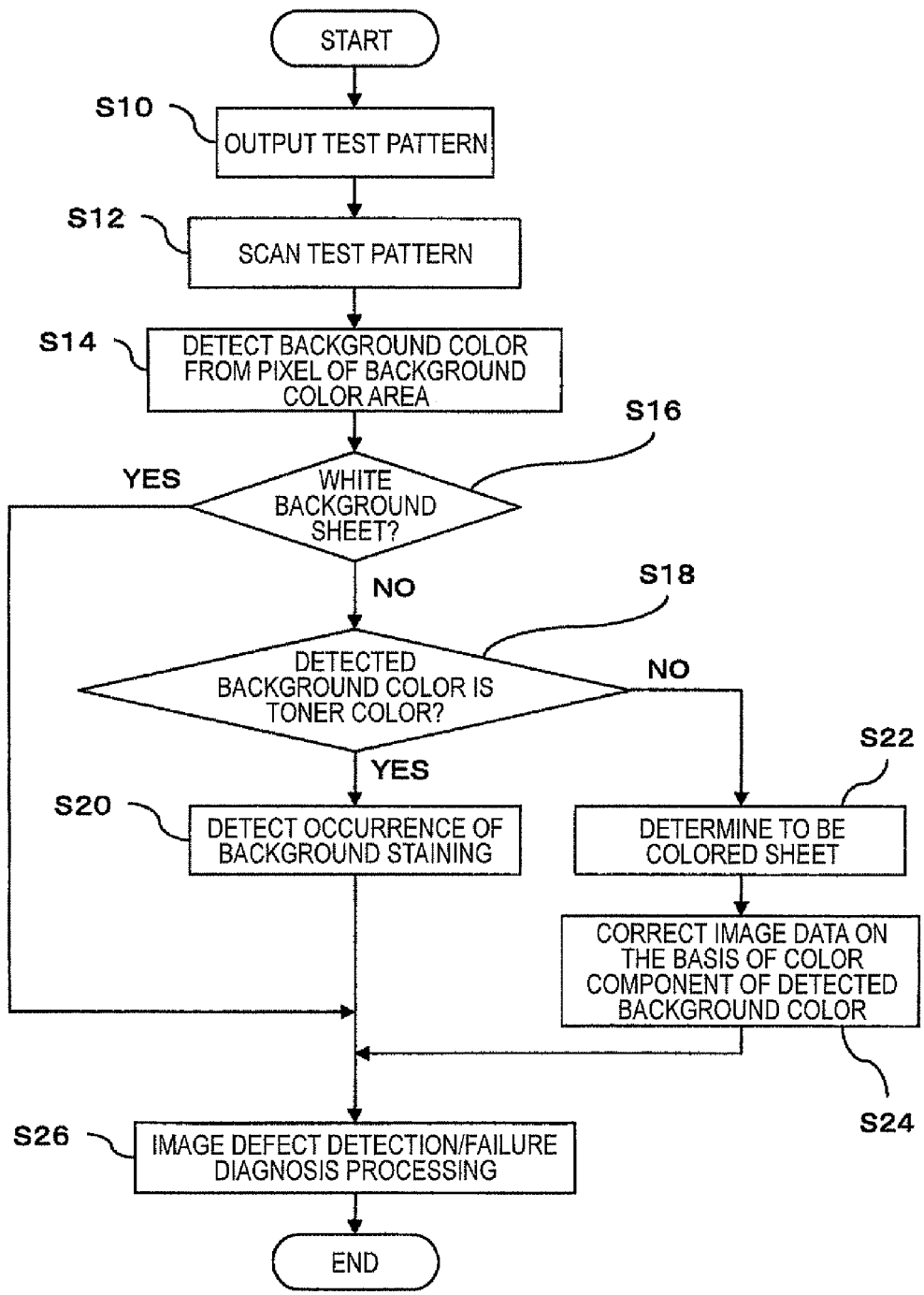
FIG. 5 is a flowchart showing an example of the procedure of processing to be executed by a failure diagnosis section.

FIG. 5 is a flowchart showing an example of the procedure of the failure diagnosis processing in the image forming apparatus 1. The processing of the procedure shown in FIG. 5 starts, for example, when the operation input receiving section 6 receives an input of the operator who gives an instruction to start the failure diagnosis processing.

Referring to FIG. 5, first, the print engine section 3 acquires a test pattern stored in the storage section 4, prints the acquired test pattern on a sheet, and outputs the printed sheet (Step S10).

The operator places the test pattern sheet with the test pattern printed thereon on an image inputting platen (not shown) provided in the image inputting section 2, and instructs the start of scanner inputting by the operation input receiving section 6. The image inputting section 2 that receives the instruction to start scanner inputting by the operation input receiving section 6 inputs the test pattern sheet and generates image data (Step S12). Image data is delivered to the background color processing section 70 of the failure diagnosis section 7.

Next, the background color area acquisition section 700 of the background color processing section 70 acquires the values of pixels in the prescribed background color areas from image data of the test pattern sheet. The background color detection section 702 detects the background color of the test pattern sheet based on the values of pixels in the background color areas (Step S14). The background color detection processing in Step S14 may be performed by using a known technique in the field of image processing. For example, the histogram of the gradation values of pixels in the background color areas is calculated with regard to each color component of RGB, and the gradation value having the maximum number of pixels in each color component is set to the gradation value of each color component of RGB of the background color of the test pattern sheet.

After the background color detection processing (Step S14), the background staining detection section 704 determines whether or not the test pattern sheet is a white background sheet (Step S16). In Step S16, for example, it is determined whether the background color detected in Step S14 is an achromatic color or a chromatic color. If the background color is an achromatic color, it is determined that the sheet is a white background sheet, and if the background color is a chromatic color, it is determined that the sheet is not a white background sheet. The determination on whether the background color is an achromatic color or a chromatic color may be performed by determining whether or not a difference between the gradation values of the respective color components of RGB of the background color detected in Step S14 is equal to or less than a prescribed threshold value. If the background color is an achromatic color, the gradation values of the respective color components of RGB are deemed to be substantially equal. Accordingly, if the difference between the gradation values of the respective color components exceeds the threshold value, it is determined that the background color is a chromatic color, and if the difference is equal to or less than the threshold value, it is determined that the background color is an achromatic color. In an example of the determination processing, with the gradation value of one of the color components of RGB as reference, a difference between the gradation value of the color component as reference and the gradation value of each of other two color components is calculated, and if the difference in the gradation value from any one of the relevant two color components exceeds the threshold value, it is determined that the background color is a chromatic color, and if the difference in the gradation value from any color component is equal to or less than the threshold value, it is determined that the background color is an achromatic color.

If it is determined that the test pattern sheet is a white background sheet (YES in Step S16), the background color processing section 70 delivers image data to the image defect detection section 72, so the image defect detection processing and the failure diagnosis processing are performed by using image data (Step S26). The details of the image defect detection/failure diagnosis processing in Step S26 will be described below.

If it is determined that the test pattern sheet is not a white background sheet (NO in Step S16), the toner color determination section 7040 of the background staining detection section 704 determines whether or not the detected background color is a toner color (Step S18).

With regard to the determination of Step S18, for example, a table in which each toner color (in this example, each color of YMCK) is associated with the combination of the gradation values of the respective color components when the relevant toner color is represented by the colorimetric system of image data (in this example, RGB color space) is stored in advance in the storage section 4, so the determination is performed with reference to the table. If the gradation values of the respective color components of the background color correspond to the gradation values of the respective color components associated with any toner color in the table stored in the storage section 4, it is determined that the background color is a toner color. If the gradation values of the respective color components of the background color do not correspond to the gradation values of the respective color components associated with any toner color, it is determined that the background color is not a toner color. In the following Example 1, an example of the RGB values associated with each toner color of YMCK in the above-described table is shown.

Example 1

<Toner color>: (<R value>, <G value>, <B value>)
Y: (250 to 255, 250 to 255, 0 to 5)
M: (250 to 255, 0 to 5, 250 to 255)
C: (0 to 5, 250 to 255, 250 to 255)
K: (0 to 5, 0 to 5, 0 to 5)

According to the table of Example 1, when all the gradation values of the respective color components of RGB of the background color are within the range of the value expressed by (<R value>, <G value>, <B value>), it is determined that the background color is a toner color corresponding to the combination of the relevant ROB values. For example, if the gradation value of the R component of the background color is in a range of 250 to 255, the gradation value of the G component is in a range of 250 to 255, and the gradation value of the B component is in a range of 0 to 5, it is determined that the background color is the toner color Y.

In another example of the determination processing in Step S18, the gradation values of the respective color components of the background color (in this example, the RGB values) are converted into the values of the respective color components in the colorimetric system of the toner color (in this example, YMCK color space), and when one of the values of the respective color components after conversion is significantly large, it is determined that the background color is a toner color. For example, a difference between the maximum value from among the values of YMCK representing the background color and the second largest value is calculated, and when the calculated difference is larger than a prescribed threshold value, it is determined that the background color is a toner color having the relevant maximum value. Alternatively, when the value of one color from among the values of YMCK representing the background color exceeds a prescribed first threshold value, and the values of other three colors are all equal to or less than a prescribed second threshold value (which is set to be a value smaller than the first threshold value), it may be determined that the background color is a toner color having a value larger than the first threshold value. Note that a conversion equation which is used to express the colors of the RGB color space by the calorimetric system of the toner color may be stored in advance in the storage section 4.

If the background color is a toner color (YES in Step S18), the background staining detection section 704 detects the occurrence of background staining (Step S20), and delivers image data to the image defect detection section 72 along with information representing the occurrence of background staining. Then, the process progresses to Step S26.

If the background color is not a toner color (NO in Step S18), the background staining detection section 704 determines that the test pattern sheet is a colored sheet (Step S22). The term "colored sheet" is a concept including a sheet having an original background color of a chromatic color, and a sheet which originally had a white background color but had a chromatic background color due to deterioration or the like.

After Step S22, a background color correction processing is performed by the background color correction section 706 (Step S24). In the background color correction processing, the background color in image data is corrected based on the color components which are detected as the background color. The background color correction processing may be performed by using a known technique in the field of image processing. For example, the background color is removed by setting the ROB values of pixels having the RGB values corresponding to the background color to the values (R,G,B= (255,255,255)) which correspond to white. Further, in addition to the removal of the background color, the RGB values may be converted with regard to pixels other than the pixels having the RGB values corresponding to the background color, such that the boundary is smoothened between the areas of the pixels having the RGB values corresponding to white for removal of the background color and the areas of other pixels. When the background color correction processing ends, the background color processing section 70 delivers image data after correction to the image defect detection section 72, and then the process progresses to Step S26.

In the image defect detection/failure diagnosis processing in Step S26, image defects are detected by the image defect detection section 72, and the failure cause is estimated by the failure cause estimation section 78.

The image defect detection section 72 compares image data received from the background color processing section 70 with reference image data stored in the storage section 4, and detects image defects. For example, the image defect detection section 72 calculates differential data between image data acquired from the background color processing section 70 and reference image data acquired from the storage section 4 (for example, data including a difference in the gradation value between the color components of the respective pixels at corresponding positions of image data and reference image data), and detects image defects based on differential data. For example, in differential data, an area with a pixel, having a difference from reference image data larger than a predetermined threshold value, is detected as an area having an image defect. Image data that is to be processed by the image defect detection section 72 is image data which is the result of processing by the background color processing section 70. Therefore, even though the background color of the test pattern sheet is a chromatic color, when it is determined that the background color is not a toner color (NO in Step S18), the image defect detection processing is performed with respect to image data which is the result of the background color correction processing (Step S24). Thus, in Step S26, there is no case where the background color portion of image data is detected as an area having a defect. When it is determined that the background color of the test pattern sheet is a chromatic color and a toner color (YES in Step S18), the image defect detection processing is performed with respect to image data, while the background color correction processing is not performed. Thus, the background color portion of image data is detected as an area having a defect.

After the end of the image defect detection processing by the image defect detection section 72, the characteristic amount extraction section 74 extracts the characteristic amounts of the detected image defect. For example, the shape, size, density, contour state, position, cyclic property, generation area, and the like of the defect area detected by the image defect detection section 72 are extracted as the characteristic amounts. When the background staining detection section 7040 of the background color processing section 70 detects the occurrence of background staining (Step S20), the characteristic amount extraction section 74 may acquire information representing the occurrence of background staining and information regarding the detected background color (for example, the RGB values representing the background color and the corresponding toner color) from the background color processing section 70 through the image defect detection section 72, and may set the relevant information regarding the background color as the characteristic amount of background staining. The characteristic amounts extracted by the characteristic amount extraction section 74 are delivered to the defect type determination section 76, so the type of the defect (for example, spot, black streak, black band, blank spot, white band, or the like) is determined.

For execution of the failure diagnosis processing, the failure cause estimation section 78 acquires the characteristic amounts extracted by the characteristic amount extraction section 74 and the type of the defect determined by the defect type determination section 76. The failure cause estimation section 78 further acquires the internal state information of the image forming apparatus 1 from the sensor section 5, and acquires the history information of the image forming apparatus 1 from the storage section 4. If necessary, the failure cause estimation section 78 also acquires input information by the operator through the operation input receiving section 6. The input information to be acquired by the failure cause estimation section 78 is information which is used as reference for the failure diagnosis of the image forming apparatus 1. For example, information representing whether a defect in an output image of the image forming apparatus 1 has occurred at the time of execution of a copy operation or a print operation is input by the operator and acquired by the failure cause estimation section 78. For example, when a defect has occurred in the output image at the time of execution of the copy or print operation, it is considered that the failure cause rests in the print engine section 3 related to image output. Even though no defect has occurred in the output image at the time of execution of the print operation, when a defect has occurred in the output image at the time of execution of the copy operation, it is considered that the failure cause rests in the image inputting section 2 related to image input. Therefore, the failure cause estimation section 78 may perform the failure diagnosis processing with reference to input information such as described above regarding the situation when a defect has occurred in the output image.

If various kinds of information are acquired for use in execution of failure diagnosis, the inference engine 780 of the failure cause estimation section 78 calculates the failure cause probability with respect to the candidates of the failure cause based on the acquired information by using the Bayesian network. The Bayesian network used here includes nodes corresponding to various kinds of information to be acquired for the execution of failure diagnosis, such as the characteristic amount of the image defect and the type of the defect, the internal state information and history information of the image forming apparatus 1, the input information of the operator, and the like, and nodes corresponding to the candidates of the failure cause, and is constructed by a directed graph with the nodes linked to each other in accordance with the causal relationship.

The failure candidate extraction section 782 that receives the failure cause probability calculated by the inference engine 780 extracts the candidates of the failure cause in accordance with the received failure cause probability. For example, the failure candidate extraction section 782 extracts a candidate having the highest failure cause probability calculated by the inference engine 780, or extracts a predetermined number of candidates in a descending order of the failure cause probability. If the candidates of the failure cause are extracted, the failure candidate extraction section 782 delivers the extracted candidates of the failure cause to the diagnosis result notification section 79 as the result of the failure diagnosis processing.

When the image defect detection/failure diagnosis processing (Step S26) ends, the processing of the procedure shown in FIG. 5 ends. After the end of the processing of the procedure shown in FIG. 5, the diagnosis result notification section 79 notifies the user or the administrator of the result of the failure diagnosis processing.

Figure 6:
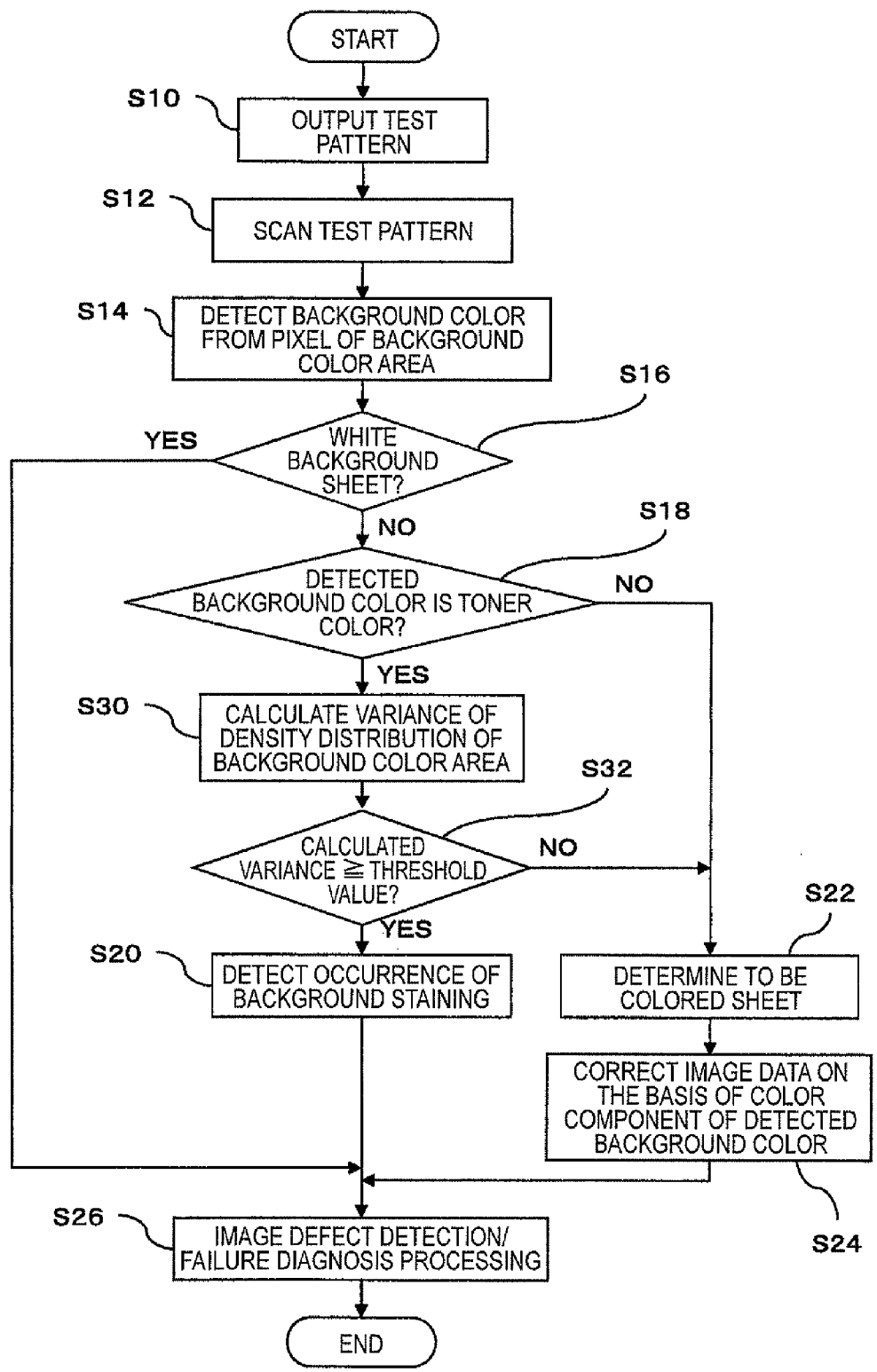
FIG. 6 is a flowchart showing another example of the procedure of processing to be executed by a failure diagnosis section.

FIG. 6 is a flowchart showing another example of the procedure of processing to be executed by the failure diagnosis section 7. In FIG. 6, the same steps as those in the flowchart of FIG. 5 are represented by the same reference numerals as those in FIG. 5.

The processing of the procedure shown in FIG. 6 is different from the processing of the procedure shown in FIG. 5 in that, between Steps S18 and S20 in the flowchart of FIG. 5, there are processing for calculating the variance of the density distribution of the background color area (that is, the variance of the gradation values of the pixels) (Step S30), and processing for determining whether or not the calculated variance is equal to or more than a prescribed threshold value (Step S32). Referring to FIG. 6, in Steps S10 through S18, the same processing as described above with reference to FIG. 5 is performed, and when it is determined that the color of each background color area is a toner color (YES in Step S18), the variance value calculation section 7042 of the background staining detection section 704 calculates the variance of the density distribution of the background color area (Step S30). In this example, the variance of the gradation values of the pixels of the background color area is calculated with respect to one color component of the three components of RGB. As the color component for variance calculation, for example, one color component which is produced with the highest density may be selected in accordance with a toner color detected as the background color. Further, the variance of the gradation values may be calculated with respect to a color component having the maximum value from among the RGB values representing the background color.

Next, if the calculated variance is equal to or more than a prescribed threshold value (YES in Step S32), the occurrence of background staining is detected (Step S20). If the calculated variance is less than the threshold value (NO in Step S32), it is determined that the sheet is a colored sheet (Step S22).

Steps S20, S22, S24, and S26 are the same as the steps represented by the same reference numerals in FIG. 5.

When the variance of the gradation values of the pixels in the background color area is equal to or more than a threshold value, the principle of the detection (Steps S30 and S32 of FIG. 6) of the occurrence of background staining will be described with reference to FIG. 7. FIG. 7 shows an example of the histogram of the gradation values of the pixels in the background color area either when the test pattern sheet is a colored sheet or when background staining has occurred. In FIG. 7, the solid-line histogram shows an example of the case where the sheet is a colored sheet, and the broken-line histogram shows an example of the case where background staining has occurred. When the test pattern sheet is a colored sheet, the entire sheet is uniformly colored. When background staining has occurred, even though the sheet is visually colored uniformly, at the micro level, there may be points where toner is adhered and points where no toner is adhered. Accordingly, as illustrated in FIG. 7, the variation (variance) of the gradation values of the pixels when the test pattern sheet is a colored sheet is smaller than the variation (variance) of the gradation values of the pixels when background staining has occurred. Therefore, for example, if the maximum value of the variance of the gradation values of the pixels of image data obtained by inputting a colored sheet is calculated in advance by an experiment, and a value equal to or more than the maximum value is used as the threshold value in Step S32, when the variance of the gradation values of the pixels is equal to or more than the threshold value, it can be determined that background staining has occurred.

In the exemplary embodiment described above, the failure cause estimation section 78 estimates the failure candidates by the inference engine 780 using the Bayesian network. In another exemplary embodiment, the failure cause estimation section 78 may be configured such that the failure cause is estimated by using a case-based expert system. Alternatively, the failure cause estimation section 78 may use an artificial neural network. No matter how the failure cause is estimated, the failure cause estimation section 78 performs the failure diagnosis processing by using the type and the characteristic amount of the image defect to be obtained through the image defect detection processing with respect to image data which is the result of the processing by the background color processing section 70. The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a determination unit determining, based on a pixel value of a prescribed background color area, where printing is not expected, in image data obtained by inputting a printed image, and based on a range of gradation levels of a toner used in printing the image, the range of gradation levels being stored in a storage section, whether or not the background color of the image corresponds to a color of the toner.

2. The image processing apparatus according to claim 1, further comprising:
a detection unit detecting an occurrence of background staining in the image when the determination unit determines that the background color of the image corresponds to the color of the toner.

3. The image processing apparatus according to claim 2, further comprising:
a calculation unit calculating a variance of the pixel value of the background color area when the determination unit determines that the background color of the image corresponds to the color of the toner.

4. The image processing apparatus according to claim 3, wherein the calculation unit calculates the variance of the pixel value of the background color area with respect to a color component to be selected in accordance with the color of the toner corresponding to the background color of the image.

5. The image processing apparatus according to claim 3, wherein, when the determination unit determines that the background color of the image corresponds to the color of the toner, and when the value of the variance calculated by the calculation unit is equal to or more than a prescribed threshold value, the detection unit detects the occurrence of background staining in the printed image.

6. The image processing apparatus according to claim 4, wherein, when the determination unit determines that the background color of the image corresponds to the color of the toner, and when the value of the variance calculated by the calculation unit is equal to or more than a prescribed threshold value, the detection unit detects the occurrence of background staining in the printed image.

7. The image processing apparatus according to claim 1, further comprising:
a correction unit correcting image data in accordance with the pixel value of the background color area when the determination unit determines that the background color of the image does not correspond to the color of the toner.

8. The image processing apparatus according to claim 2, further comprising:
a correction unit correcting image data in accordance with the pixel value of the background color area when the determination unit determines that the background color of the image does not correspond to the color of the toner.

9. The image processing apparatus according to claim 3, further comprising:
a correction unit correcting image data in accordance with the pixel value of the background color area when the determination unit determines that the background color of the image does not correspond to the color of the toner.

10. The image processing apparatus according to claim 4, further comprising:
a correction unit correcting image data in accordance with the pixel value of the background color area when the determination unit determines that the background color of the image does not correspond to the color of the toner.

11. The image processing apparatus according to claim 5, further comprising:
a correction unit correcting image data in accordance with the pixel value of the background color area when the determination unit determines that the background color of the image does not correspond to the color of the toner.

12. The image processing apparatus according to claim 3, further comprising:

a correction unit correcting image data in accordance with the pixel value of the background color area when the value of the variance calculated by the calculation unit is less than a prescribed threshold value.

13. The image processing apparatus according to claim 4, further comprising:
a correction unit correcting image data in accordance with the pixel value of the background color area when the value of the variance calculated by the calculation unit is less than a prescribed threshold value.

14. The image processing apparatus according to claim 5, further comprising:
a correction unit correcting image data in accordance with the pixel value of the background color area when the value of the variance calculated by the calculation unit is less than a prescribed threshold value.

15. The image processing apparatus according to claim 6, wherein, an estimation processing unit that executes an estimation processing to estimate a cause of failure in the image processing apparatus by using information obtained from image data is caused to execute the estimation processing by using information obtained from image data corrected by the correction unit.

16. The image processing apparatus according to claim 7, wherein, an estimation processing unit that executes an estimation processing to estimate a cause of failure in the image processing apparatus by using information obtained from image data is caused to execute the estimation processing by using information obtained from image data corrected by the correction unit.

17. A non-transitory computer readable medium storing a program causing a computer to execute a process for determining a background color of an image, the process comprising:
determining, based on a pixel value of a prescribed background color area, where printing is not expected, in image data obtained by inputting a printed image, and based on a range of gradation levels of a toner used in printing the image, the range of gradation levels being stored in a storage section, whether or not the background color of the image corresponds to a color of the toner.

* * * * *